US012571266B2

(12) United States Patent
Miller

(10) Patent No.: US 12,571,266 B2
(45) Date of Patent: Mar. 10, 2026

(54) FLEXIBLE CONNECTOR FOR JOINING A COILED TUBING AND A BOTTOM HOLE ASSEMBLY

(71) Applicant: Rusty Allen Miller, Seminole, TX (US)

(72) Inventor: Rusty Allen Miller, Seminole, TX (US)

(73) Assignee: RAM WELDING, INC., Seminole, TX (US)

( * ) Notice: Subject to any disclaimer, the term of this patent is extended or adjusted under 35 U.S.C. 154(b) by 0 days.

(21) Appl. No.: 17/748,430

(22) Filed: May 19, 2022

(65) Prior Publication Data

US 2022/0389772 A1 Dec. 8, 2022

Related U.S. Application Data

(60) Provisional application No. 63/193,499, filed on May 26, 2021.

(51) Int. Cl.
*E21B 17/04* (2006.01)
*E21B 17/02* (2006.01)
*E21B 17/20* (2006.01)
*F16L 13/02* (2006.01)

(52) U.S. Cl.
CPC ............ *E21B 17/041* (2020.05); *E21B 17/20* (2013.01); *F16L 13/0209* (2013.01); *E21B 17/02* (2013.01)

(58) Field of Classification Search
CPC ......... E21B 17/041; E21B 17/20; E21B 17/02
See application file for complete search history.

(56) References Cited

U.S. PATENT DOCUMENTS

| | | | | |
|---|---|---|---|---|
| 4,612,984 A * | 9/1986 | Crawford | ............... | E21B 37/00 166/77.2 |
| 6,264,244 B1 * | 7/2001 | Isennock | ................ | E21B 17/04 285/55 |
| 6,474,701 B1 * | 11/2002 | Bowles | ................ | F16L 13/141 285/256 |
| 7,150,479 B2 * | 12/2006 | Benedict | .............. | E21B 17/028 285/333 |
| 10,012,033 B2 * | 7/2018 | Schultz | ................ | E21B 17/026 |
| 10,041,317 B1 * | 8/2018 | Swinford | ............... | E21B 34/12 |
| 11,408,229 B1 * | 8/2022 | Randall | ................... | E21B 29/06 |
| 2006/0006648 A1 * | 1/2006 | Grimmett | ............ | E21B 43/106 285/333 |
| 2007/0000669 A1 * | 1/2007 | McKee | ................ | E21B 17/041 166/242.6 |
| 2008/0047716 A1 * | 2/2008 | McKee | ................ | E21B 17/046 166/242.6 |
| 2008/0073085 A1 * | 3/2008 | Lovell | ..................... | E21B 19/16 166/380 |
| 2008/0169094 A1 * | 7/2008 | Ehtesham | ............... | E21B 17/20 166/242.6 |
| 2010/0206583 A1 * | 8/2010 | Swietlik | ................. | E21B 17/02 166/380 |

(Continued)

*Primary Examiner* — Neel Girish Patel
(74) *Attorney, Agent, or Firm* — G. Michael Roebuck; THE MOSTER LAW FIRM

(57) ABSTRACT

A flexible connector for connecting coiled tubing to a bottom hole assembly is disclosed. The flexible connector has multiple internal diameters that reduces breakage due bending down hole and reduces turbulence of fluid flowing through the coiled tubing, flexible connector, and bottom hole assembly. The flexible connector also reduces the chances of a bottom hole assembly attached by the flexible connector to a coiled tubing being stuck down hole.

6 Claims, 10 Drawing Sheets

(56)          References Cited

U.S. PATENT DOCUMENTS

| | | | |
|---|---|---|---|
| 2010/0230958 A1* | 9/2010 | Holland | E21B 43/106 |
| | | | 285/333 |
| 2011/0232907 A1* | 9/2011 | Bryant | E21B 33/068 |
| | | | 166/300 |
| 2012/0217014 A1* | 8/2012 | Groves | E21B 43/26 |
| | | | 166/308.1 |
| 2013/0076025 A1* | 3/2013 | Gipson | E21B 17/041 |
| | | | 137/15.01 |
| 2015/0096346 A1* | 4/2015 | Kirby | B21J 5/08 |
| | | | 72/342.1 |
| 2016/0230503 A1* | 8/2016 | Holmberg | E21B 34/10 |
| 2016/0265288 A1* | 9/2016 | Kenworthy | E21B 43/12 |
| 2019/0017634 A1* | 1/2019 | Williamson | B21C 37/28 |
| 2019/0203538 A1* | 7/2019 | Wisinger Jr. | E21B 17/041 |
| 2019/0284895 A1* | 9/2019 | Marsh | E21B 17/041 |
| 2020/0024916 A1* | 1/2020 | Andreychuk | E21B 43/26 |
| 2022/0243539 A1* | 8/2022 | LaPlante | F16L 37/091 |
| 2022/0307329 A1* | 9/2022 | Jones | E21B 17/006 |

* cited by examiner

Torque Vs Time

FLEXIBLE CONNECTOR FOR JOINING A COILED TUBING AND A BOTTOM HOLE ASSEMBLY

CROSS REFERENCE TO RELATED APPLICATIONS

This patent application claims priority from U.S. provisional patent application Ser. No. 63/193,499 filed by Rusty Allen Miller on May 26, 2021, and entitled A FLEXIBLE CONNECTOR FOR JOINING A COILED TUBING AND A BOTTOM HOLE ASSEMBLY, which is hereby incorporated by reference in its entirety.

BACKGROUND OF THE INVENTION

In the past connectors that join coiled tubing to a bottom hole assembly have been rigid and inflexible causing the premature failure of the rigid and inflexible connectors and contribute to the down hole assembly and coiled tubing to become stuck downhole.

FIELD OF THE INVENTION

The present invention is in the field of coiled tubing connectors for joining the coiled tubing to a bottom hole assembly.

BRIEF DESCRIPTION OF THE DRAWINGS

FIG. 2 is a comparative torque curve for a particular illustrative embodiment of the invention;

Figure 1:
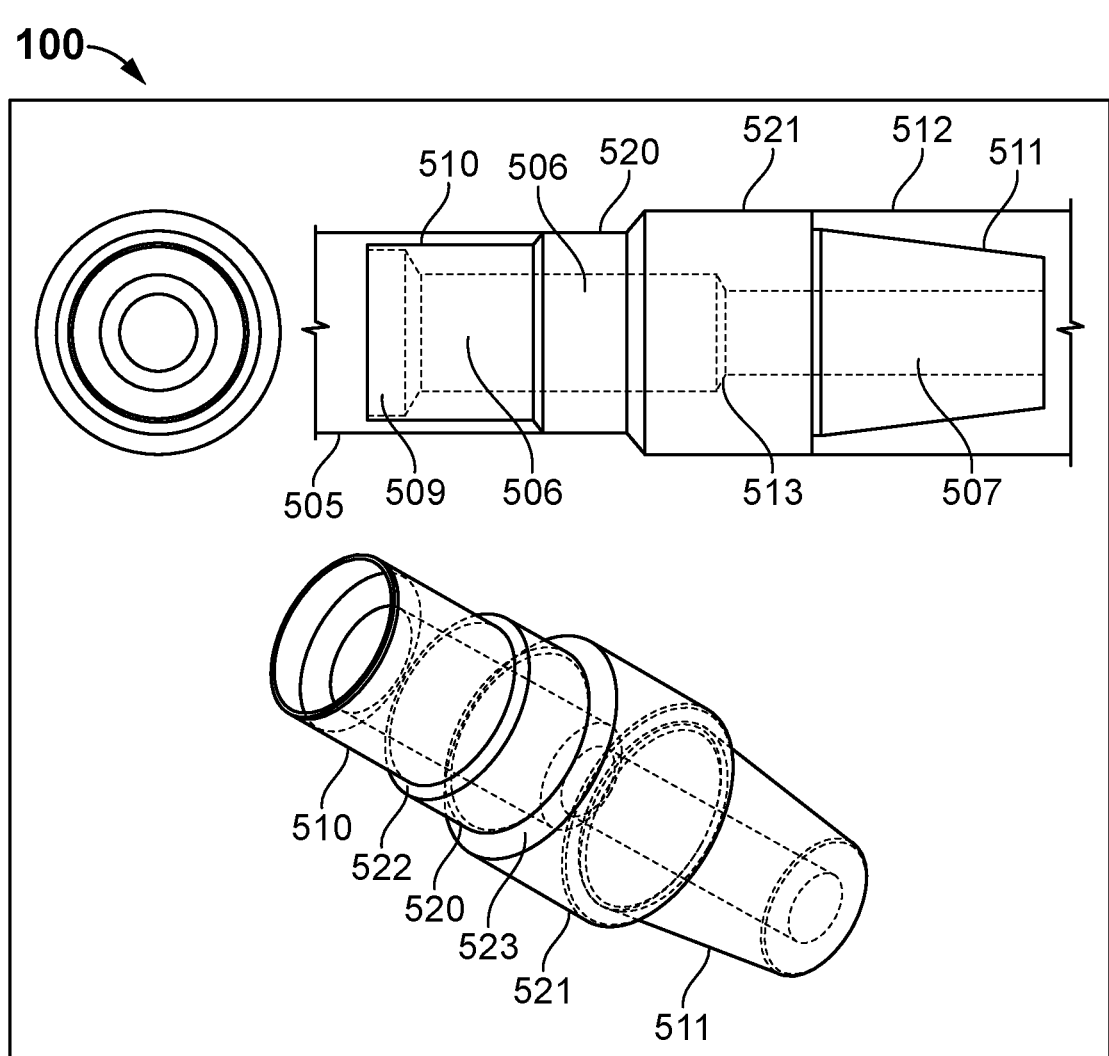
FIG. 1 is a schematic depiction of an illustrative embodiment of the invention.

The drawings presented herein are for illustrative purposes only and do not limit the scope of the claims. Rather, the drawings are intended to help enable one having ordinary skill in the art to make and use the claimed inventions.

SUMMARY OF THE INVENTION

A flexible connector for connecting coiled tubing to a bottom hole assembly is disclosed. The flexible connector has multiple internal diameters that reduces breakage due bending down hole and reduces turbulence of fluid flowing through the coiled tubing, flexible connector, and bottom hole assembly. The flexible connector also reduces the chances of a bottom hole assembly attached by the flexible connector to a coiled tubing being stuck down hole.

DETAILED DESCRIPTION OF THE INVENTION

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are drawn to scale, but do not show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that issues therefrom.

In a particular illustrative embodiment of the invention a flexible internal weld on connector for coil tubing applications is disclosed. This connector utilizes a "flexible" design consisting of multiple inside diameter changes to produce an improved fluid connection and transition from coil tubing to a bottom hole assembly (BHA). The multiple inside diameter changes leads to greater efficiency and performance for downhole drilling applications, substantially eliminates the risk of fracture at the coil/connector joint and contains all fluid turbulence/friction inside the connector body.

In a particular illustrative embodiment of the invention a connector is disclosed that provides a fluid transition from the coil tubing to the BHA without significantly lengthening the BHA or adding additional components. A more flexible transition between coil and the BHA provides a higher level of protection for both the coil tubing and tool string while also increasing drilling efficiencies.

In a particular illustrative embodiment of the invention a multi stage internal diameter (ID) transition connector is provided. This multi stage ID change accomplishes 2 primary actions: the flexible connector substantially matches the flexibility of the coiled tubing with the flexibility of the flexible connector while transitioning to the increased strength and reduced flexibility of the BHA. In a particular illustrative embodiment of the invention the flexible multi stage transition connector transfers the stress point of the coiled tubing and the BHA tool string into the body of the flexible connector, reducing the risks of parting pipe or breaking tools downhole. The flexible multi stage transition connector decreases friction forces experienced downhole due to the flexible design and increase in maneuverability and reduces the risk of the coiled tubing and flexible connector attached to the BHA becoming stuck downhole.

Turning now to FIG. 1, in a particular illustrative embodiment of the invention a flexible connector 100 is provided. A top end 510 of the flexible connector slides inside of a bottom end of a coiled tubing 505 bottom end. The bottom end of the coiled tubing 505 is welded to the top end 510 of the flexible connector at shoulder 522. The bottom end of the flexible connector 511 is threaded and connects to the bottom hole assembly 512. A first section 509 (top section) of the flexible connector is machined having an internal diameter about the same internal diameter as the coiled tubing, leaving a 0.080 inch thickness between the internal diameter and the outside diameter of the flexible connector and runs for a length of 1.5 inch. A second section 506 of the flexible connector has an internal diameter of 1.5 inches and runs about 4.5 inches. A third section 507 of the flexible connector has a 1 inch internal diameter and runs approximately 4.5 inches. The second section 506 of the flexible connector has substantially the same flexibility as the coiled tubing. The third section 507 has a 1 inch internal diameter. A second junction 513 between the second and third sections is necked down at a 75 degree angle between the 1.5 inch internal diameter section 506 and the 1 inch diameter section 507. A first junction 514 between the first and second sections is necked down at a 75 degree angle between the coiled tubing internal diameter second 509 and the 1.5 inch internal diameter section 506. Typically other connectors are necked down to 1 inch immediately without the 1.5 inch section 506. The 1.5 inch section is a transition zone where fluid from the coiled tubing experiences eddy currents and turbulence from down hole fluids containing cuttings and flowing through the connector. The two-stage step-down internal diameters of the flexible connector, 1.5 inch and subsequently 1.0 inch internal diameters move the main turbulence point to junction 513 and reduces turbulence and abrasion inside of the connector as the step down is in two stages at junctions 514 and 513.

A cross sectional view and three quarter view of the flexible connector is also depicted in FIG. 1. In a particular illustrative embodiment of the invention the flexible connector has four outside diameter sections and four inside diameter sections. A first section 510 of the flexible connector slides into the coiled tubing up to the shoulder 522. The coiled tubing is welded to the flexible connecter where the coiled tubing abuts the should 522. In a particular illustrative embodiment of the invention the first section 510 is 2-2⅛ inches long. In another particular embodiment of the invention the first section 510 is 5¼ inches long providing additional flexibility and less turbulence caused by the longer transition zone between the input to the connector and the first reduction in internal diameter. The ⅛ inch shoulder 522 is formed between the first section 510 and the second section 520. The second section 520 is 1⅛ inches long. In another particular embodiment of the invention the first section is 3 inches long. This additional length fits inside the coiled tubing and reduces the localized stress on the coiled tubing, providing a longer more flexible connection to the coiled tubing which reduces breakage by providing a more flexible, less rigid section of the connector inside of the coiled tubing. In a particular illustrative embodiment, the longer 3 inch top section provides substantially the same flexibility as the coil tubing would experience when tied directly to a bottom hole assembly. The second section 520 is joined by an ⅛ inch long shoulder 523 to a third section 521. The second section 520 is 2¼ inches long. The third section 521 is 2¼ inches long. The fourth section 511 is a threaded section for screwing into the bottom hole assembly. The fourth section joined to the third section. The fourth section is 2⅞ inches long. These dimensions may vary and are for illustrative purposes only.

The first and second sections of the flexible connector provided increased flexibility over prior connectors that neck down to 1 inch internal diameter without the second 1.5 section that allows increased flexibility using the flexible connector to connect the coiled tubing to the bottom hole assembly. The two stage drop down in internal diameter moves a bending flex point to inside the flexible connector at junction 513 so that the coiled tubing does not break as the coiled tubing, connector and bottom hole assembly traverse an irregular bending path down a borehole. The flexible connector also provides more flexibility to help pass through curves down hole and help prevent the coiled tubing and bottom hole assembly from getting stuck in a curved path down hole.

Figure 2:
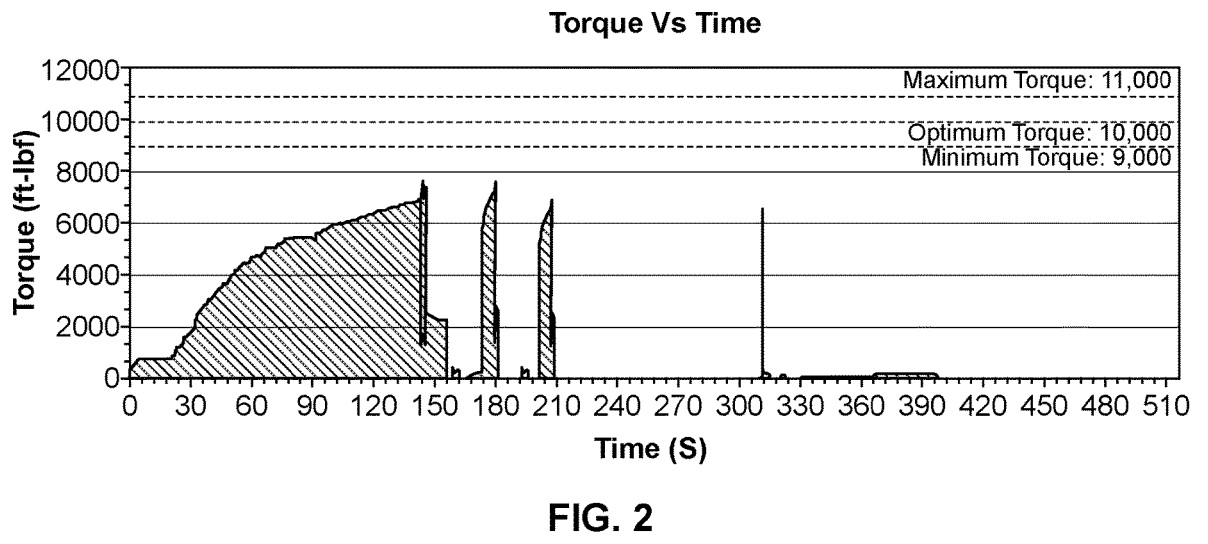

FIG. 2 is a comparative torque curve for a particular illustrative embodiment of the invention.

Figure 3:
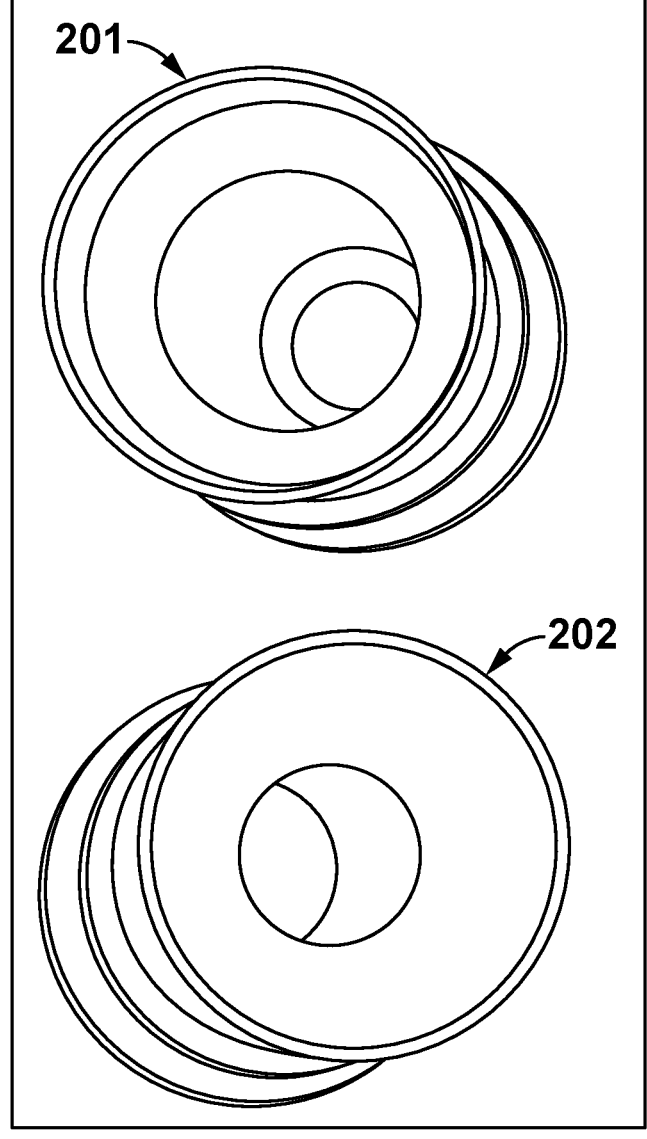
FIG. 3 is side by side depiction of a prior art connector and an illustrative embodiment of the flexible connector.

Turning now to FIG. 3, a depiction of the flexible connector 201 having a first 75 degree angle section, a second 1.5 inch internal diameter section and third 1 inch internal diameter section as opposed other connectors 202 which immediately neck down to 1 inch internal diameter.

Figure 4:
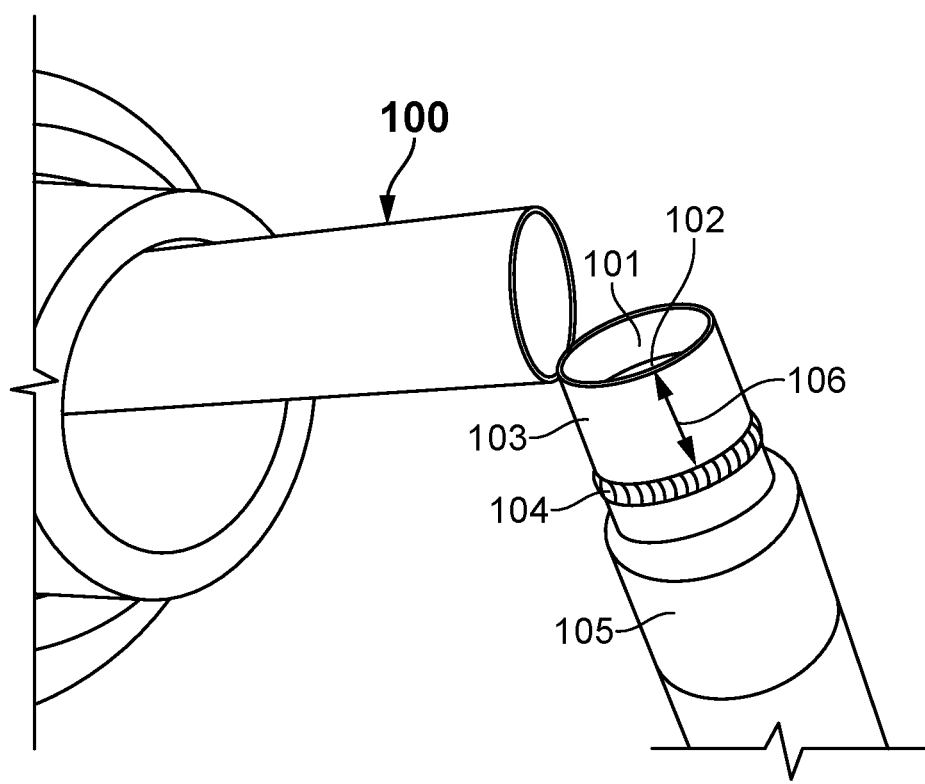
FIG. 4 is an illustration of a failure mode for a nonflexible connector.

Turning now to FIG. 4, a break is shown in coiled tubing 100 attached to a prior art 1 inch internal connector 105 having a neck 101 and internal diameter 102 of 1 inch. The broken off section of the coiled tubing 103 is shown welded at weld seam 104 to neck 101 of the prior art connector 105. The break occurred due to repeated flexing during trips down hole repeatedly flexed the coiled tubing above the rigid prior art connector. In an illustrative embodiment of the invention, the flexible connector provides more flexibility so that the coiled tubing is less likely to break from flexing.

Figures 5A, 5B, 5C:
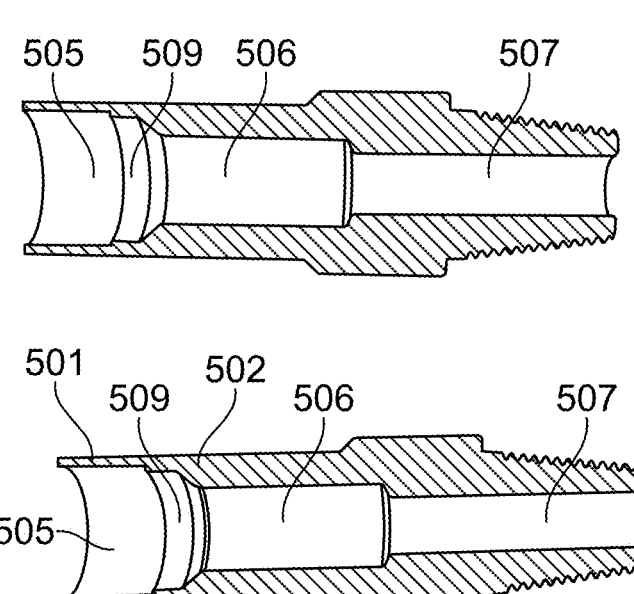
FIG. 5A, FIG. 5B and FIG. 5C are cross sections of a particular illustrative embodiment of the invention and a prior art connector.

Turning now to FIG. 5A, FIG. 5B and FIG. 5C, a side view of a prior art connector (FIG. 5C) and the flexible connector (FIG. 5A and FIG. 5B) are shown cut in half. The prior art connector shown in FIG. 5C, 503 has a neck down zone 504 which abruptly transitions to a 1 inch internal diameter section 508. The flexible connectors in an illustrative embodiment of the invention shown in FIG. 5A and FIG. 5B, connect to coiled tubing 505 and have first internal section 509, a transition zone that transitions from the coiled tubing internal diameter to a 1.5 inch internal diameter 506 and necks down again to a 1 inch internal diameter section 507.

Figure 6:
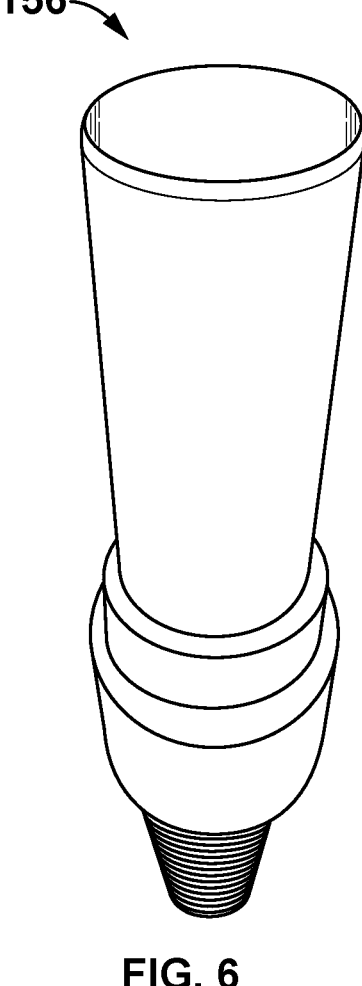
FIG. 6 is a perspective view of a particular illustrative embodiment of the invention.

Turning now to FIG. 6, FIG. 6 is a perspective view of a particular illustrative embodiment of the present invention.

Figure 7:
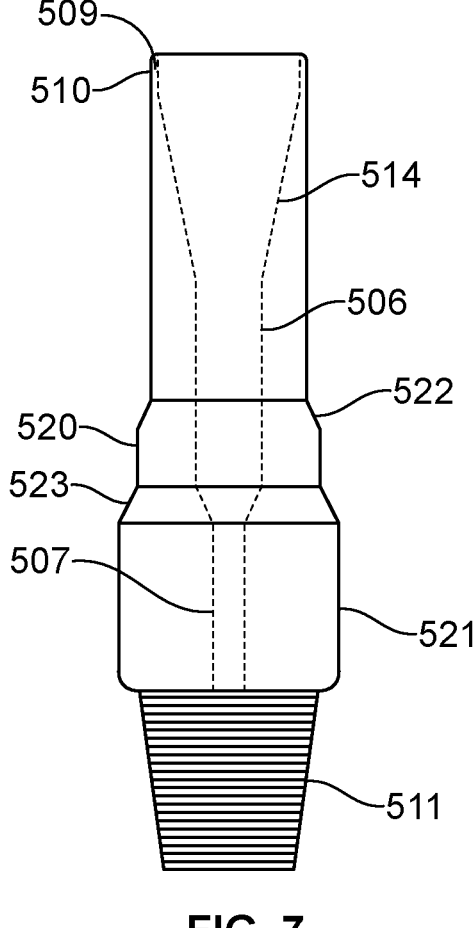
FIG. 7 is a cross section of a particular illustrative embodiment of the invention.

Turning now to FIG. 7, as shown in FIG. 7 in another embodiment of the invention a bevel 517 is configured on the top end of the connector 510. The first transition shoulder 514 is tapered to connect between the first interior diameter 572 which in a particular illustrative embodiment of the invention (shown in FIG. 7 and FIG. 8) is 2.153 inches internal diameter to the second 1.5 inch inside diameter section interior to the third interior diameter section 507. This first transition shoulder 514 is 2.35 inches long which increases the flexibility of the connector and reduces turbulence inside the connector so that the connector to coiled tubing connection is less likely to break from bending at a connection between the connector and the coiled tubing. A beveled edge 517 configured on the top end of the connector makes sliding the connector into a coiled tubing easier.

Figure 8:
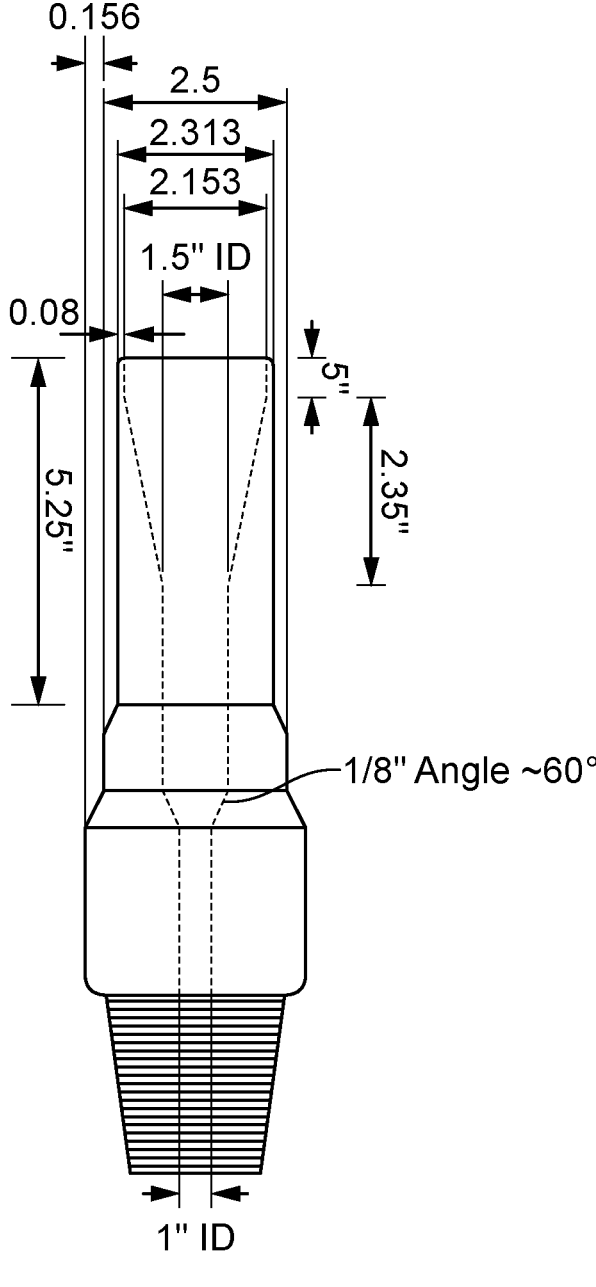
FIG. 8 is a cross section of a particular illustrative embodiment of the invention.

FIG. 8 is a side view of a cross section of a particular illustrative embodiment showing dimensions in a particular illustrative embodiment of the invention. These dimensions may vary to accommodate different size coiled tubing having varied internal diameters. In a particular illustrative embodiment of the invention the flexible connector has four outside diameter sections and four inside diameter sections. A first outside diameter section 510 of the flexible connector slides into the coiled tubing up to the outside shoulder 522. The end of the coiled tubing is welded to the flexible connecter where the end of the coiled tubing abuts the outside shoulder 522. In a particular illustrative embodiment of the invention the first section 510 is 2-2⅛ inches long. In another particular embodiment of the invention the first section 510 is 5¼ inches long providing additional flexibility and less turbulence caused by the longer transition zone between the input to the connector and the first reduction in internal diameter. The ⅛ inch shoulder 522 is formed between the first outside section 510 and the second outside section 520. The second section 520 is 1⅛ inches long. In another particular embodiment of the invention the first section is 3 inches long. This additional length of the first outside section 510 and the first internal diameter section 506 fit inside the coiled tubing and reduces the localized stress on the coiled tubing, providing a longer more flexible connection to the coiled tubing which reduces breakage by providing a more flexible, less rigid section of the connector inside of the coiled tubing. In a particular illustrative embodiment, the longer 5.25 inch top section provides substantially the same flexibility as the coil tubing would experience when tied directly to a bottom hole assembly. The second section 520 is joined by an ⅛ inch long shoulder 523 to a third section 521. The second section 520 is 2¼ inches long. The third section is 2¼ inches long. The fourth section 511 is a threaded section for screwing into the bottom hole assembly. The fourth section joined to the third section. The fourth section is 2⅞ inches long. These dimensions may vary and are for illustrative purposes only.

Figure 9:
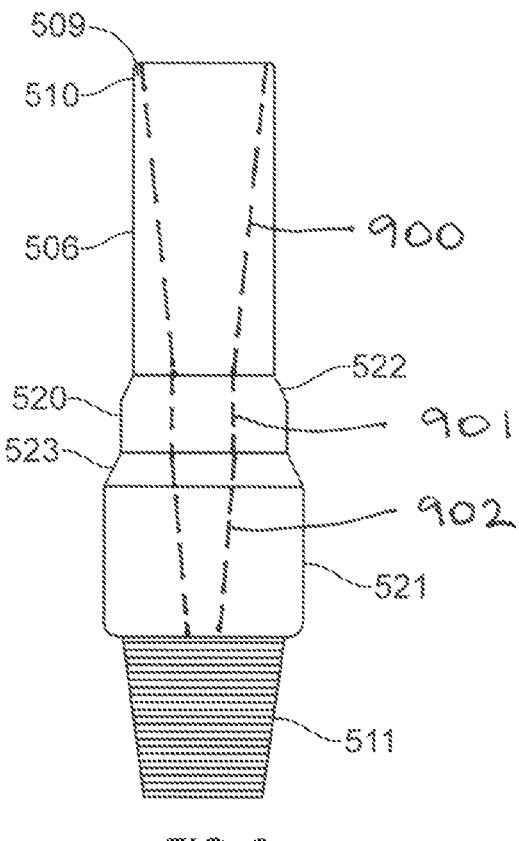
FIG. 9 is a cross section of a particular illustrative embodiment of the invention.

Turning now to FIG. 9, FIG. 9 is a cross section of a particular illustrative embodiment of the invention wherein a first internal diameter section 900 has a top end having an internal diameter that is one eighth inch less than the outside diameter of the top section of the connector and a bottom end of the first internal diameter section 900 has a bottom end the same internal diameter as a second internal diameter section 901. In a particular illustrative embodiment of the invention the second section 901 has an internal diameter of 1.5 inches. A third internal diameter section 902 has a top end that is the same internal diameter as second section 901 and tapers down to a smaller internal diameter, which in a particular illustrative embodiment of the invention the smaller diameter is 1 inch.

Figure 10:
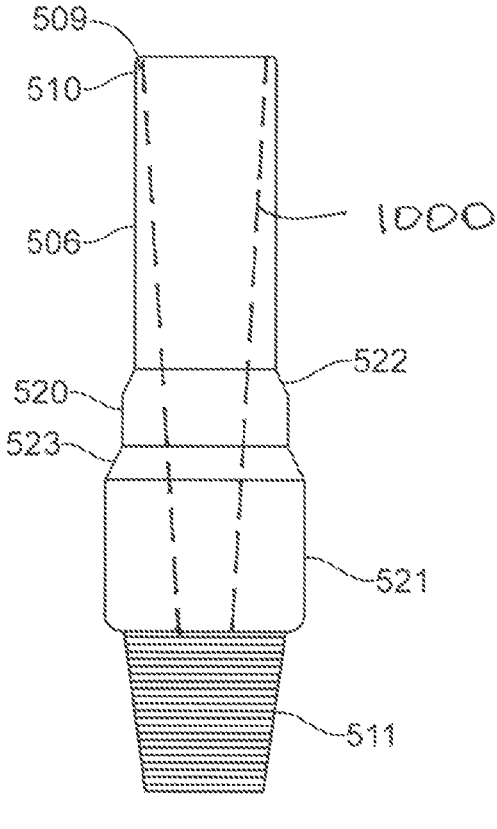
FIG. 10 is a cross section of a particular illustrative embodiment of the invention.

Turning now to FIG. 10, FIG. 10 is a cross section of a particular illustrative embodiment of the invention a first internal diameter section 1000 has a top end having an internal diameter that is one eighth inch less than the outside diameter of the top section of the connector and a bottom end of the first internal diameter section 1000 has a bottom end having an internal diameter of 1 inch.

Testing Results

During the design phase in house and 3$^{rd}$ party testing was performed in order to produce the final design parameters. These tests involved bending and pressing on different connector designs and the coil tubing itself in order to demonstrate the difference in material yields and the effects it can cause in downhole applications. Final torque and pressure tests were also performed in order to approve the final design.

Results reported below are from a controlled environment utilizing a number of different hydraulic powered equipment. These numbers demonstrate the relationship between different connector designs and how they would perform downhole. It is projected that with added downhole drilling forces, agitation, and fluid flow that these numbers would decrease drastically.

Test 1: Flex Capabilities

This flex capabilities test involved bending the pipe with different connector designs installed and measuring how much flex was allowed within the connector before pipe fracture. The type of coil used was DC 110 2⅜, 0.156 and the connector designs used was a generic industry standard 2⅜ REG weld on, a 2⅜ REG slip type, and the Flex Connect.

A side load force was exerted on the coil 12 inches away from the connector and coil joint to allow the pipe to flex. The slip type experienced no bending action and the pipe fractured at the top of the connector at approximately 50,000 lbs of force. The generic weld on sample had a similar experience. No amount of bending action was examined, and the pipe again fractured at the top of the internal sleeve at approximately 50,000 lbs of force. The flex connect however, began to bend along with the coil at 26,000 lbs. the max force exerted was stopped at 40,000 lbs. due to the amount of flex achieved surpassed both the equipment tolerances and casing limitations. The flex connect bent a total of 2.5 in vertically without any sort of pipe damage recorded at 40,000 lbs of force.

TABLE 1

|  | Force (lb.'s) | Distance (in) | Force (lb.'s) | Distance (in) |
| --- | --- | --- | --- | --- |
| Slip Type | 50,000 | 0 | N/A | N/A |
| Generic Weld-on | 50,000 | 0 | N/A | N/A |
| Flex Connect | 26,000 | 0.1 | 40,000 | 2.5 |

Test Results Concluded.

The goal of this test was to show the amount of damage a rigid connector design can cause to both coiled tubing and the BHA and how a rigid connector design limits drilling capabilities downhole. In both the slip type and generic weld on design the break strength of the pipe was reached prior to any amount of flex was allowed by the connector. In an illustrative embodiment of the invention, the flexible connector, which break strength was never reached due to the amount of flex the connector exhibited.

Test #2. Torque and Pressure

This test was conducted to test an illustrative embodiment of the invention, in high pressure and high torque applications. FIG. 2 shows the torque exerted on the connector as a steady climb and then from 2 consecutive hits to simulate a motor stall. Torque exerted capped out just under 8,000 ft-lbf. Following the torque test the Flex Connect was slowly brought up to a 10,000 lbs of pressure and left to sit for 10 min. No leaks, cracks, or failures were examined within the connector design, the weld, or the pipe.

The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A flexible connector for connecting coiled tubing to a bottom hole assembly, the connector comprising:

a top end connector section, the top end connector section having a first outside diameter that is approximately equal to an inside diameter of a bottom end of the coiled tubing, wherein the top end connector section is configured to fit inside of the bottom end of the inside diameter of the coiled tubing, wherein the top end connector section is a sufficient length to make the top end connector section substantially the same flexibility as the bottom end of the coiled tubing;

a bottom external connector section of the connector configured to fit into a bottom hole assembly;

a first internal section inside of the top end connector section having a first inside diameter constant throughout the entire length of the first internal section, the first inside diameter being less than the first outside diameter of the top end connector section;

a first internal transition shoulder configured within the top end connector section and adjacent to the first internal diameter section;

a second internal section configured adjacent to the first internal transition shoulder and configured at least partially inside of the top end connector section, the second internal section having a second inside diameter constant throughout the entire length of second internal section, the second inside diameter being less than the first inside diameter of the first internal section, the first internal transition shoulder configured between the first internal section and the second internal section, wherein the first internal transition shoulder forms a first angle between the first internal section and the second internal section;

a second internal transition shoulder adjacent to the second internal section; and a third internal section configured adjacent to the second internal transition shoulder and inside of the connector having a third inside diameter less than the second inside diameter of the second internal section, wherein the third internal section having the third inside diameter has a length that extends from the second internal transition shoulder and ends at the bottom external connector section, the third internal section having the third inside diameter remains constant over the entire length of the third internal section, the second internal transition shoulder configured between the second internal section and the third internal section, wherein the second internal transition shoulder forms a second angle between the second internal section and the third internal section, and wherein combination of the first, second and third internal sections transfers a stress point of the coiled tubing into the flexible connector, reducing the risk of parting coiled tubing and breaking tools downhole, and reduces turbulence inside of the connector by providing a transition zone inside of the flexible connector between the internal sections.

2. The connector of claim 1, wherein the second internal section has an internal diameter of 1.5 inches and the third internal section has an internal diameter section of 1 inch.

3. The connector of claim 1, wherein the top end connector section is 5¼ inches long.

4. The connector of claim 1, wherein the top end connector section is 3 inches long.

5. The connector of claim 1, wherein the top end connector section is 5¼ inches long.

6. The connector of claim 1, wherein a thickness of a wall formed between the outside diameter and the inside diameter of the top end connector section is one-eighth inch.

* * * * *